US012696206B2

(12) United States Patent
Geng et al.

(10) Patent No.: US 12,696,206 B2
(45) Date of Patent: Jul. 28, 2026

(54) DATA-AIDED SSB SIGNAL PROCESSING

(71) Applicant: MediaTek Singapore Pte. Ltd.,
Singapore (SG)

(72) Inventors: Chunhua Geng, San Jose, CA (US);
Bohan Zhang, San Jose, CA (US);
Wei-Jen Chen, Hsinchu (TW); **Yabo
Li, San Jose, CA (US); Yen-Chen
Chen, Hsinchu (TW); Bei-Hao Chang**,
Hsinchu (TW); Qian-Zhi Huang,
Hsinchu (TW); Chi-Hua Huang,
Hsinchu (TW)

(73) Assignee: MediaTek Singapore Pte. Ltd.,
Singapore (SG)

( * ) Notice: Subject to any disclaimer, the term of this
patent is extended or adjusted under 35
U.S.C. 154(b) by 515 days.

(21) Appl. No.: 18/084,968

(22) Filed: Dec. 20, 2022

(65) Prior Publication Data

US 2023/0217383 A1     Jul. 6, 2023

Related U.S. Application Data

(60) Provisional application No. 63/296,898, filed on Jan.
6, 2022, provisional application No. 63/297,247, filed
on Jan. 7, 2022.

(51) Int. Cl.
| *H04W 48/02* | (2009.01) |
| *H04J 11/00* | (2006.01) |
(Continued)

(52) U.S. Cl.
CPC ....... *H04W 56/001* (2013.01); *H04J 11/0073*
(2013.01); *H04J 11/0076* (2013.01);
(Continued)

(58) Field of Classification Search
CPC . H04W 56/001; H04W 56/0015; H04W 4/06;
H04W 72/046; H04W 48/10;
(Continued)

(56) References Cited

U.S. PATENT DOCUMENTS

| 11,996,960 B2 * | 5/2024 | Sakhnini | ............... H04L 5/0048 |
| 2002/0122471 A1 * | 9/2002 | Ling | .................... H04B 1/7115 |
| | | | 375/147 |

(Continued)

FOREIGN PATENT DOCUMENTS

| CN | 110445734 | A | | 11/2019 | |
| CN | 111669209 | A | * | 9/2020 | ........... H04B 17/318 |
| CN | 111988798 | A | * | 11/2020 | ........... H04W 24/02 |
| WO | WO-2020199220 | A1 | * | 10/2020 | ........... H04L 5/0048 |
| WO | 2020223013 | A1 | | 11/2020 | |

OTHER PUBLICATIONS

Taiwan Patent Office, "Office Action", Jun. 6, 2023, Taiwan.
China Patent Office, "Office Action", Sep. 20, 2025, China.

*Primary Examiner* — Jayanti K Patel
(74) *Attorney, Agent, or Firm* — Troutman Pepper Locke
LLP; Tim Tingkang Xia, Esq.

(57) ABSTRACT

In an aspect of the disclosure, a method, a computer-
readable medium, and an apparatus are provided. The appa-
ratus may be a UE. The UE receives a target SSB from a
base station. The UE obtains received data carried in a
broadcast channel of the target SSB. The UE reconstructs,
based on received data carried in a broadcast channel of a
previously received SSB, transmitted data placed in the
broadcast channel of the target SSB at the base station. The
UE preforms a channel estimation and/or synchronization
based on a comparison of the received data and the trans-
mitted data of the target SSB.

12 Claims, 13 Drawing Sheets

(51) Int. Cl.

| | |
|---|---|
| *H04L 5/00* | (2006.01) |
| *H04L 25/02* | (2006.01) |
| *H04W 56/00* | (2009.01) |
| *H04W 48/10* | (2009.01) |

(52) U.S. Cl.
CPC ........ *H04L 5/0051* (2013.01); *H04L 25/0212* (2013.01); *H04L 25/022* (2013.01); *H04W 48/10* (2013.01)

(58) Field of Classification Search
CPC .. H04W 48/02; H04J 11/0073; H04J 11/0076; H04L 5/0051; H04L 25/0212; H04L 25/022; H04L 5/005; H04L 25/0204; H04L 25/0224; H04L 25/0202
See application file for complete search history.

(56) References Cited

U.S. PATENT DOCUMENTS

| | | | | |
|---|---|---|---|---|
| 2018/0367269 | A1* | 12/2018 | Ly | H04L 5/0048 |
| 2021/0029572 | A1* | 1/2021 | Harada | H04W 24/10 |
| 2021/0337487 | A1* | 10/2021 | Park | H04L 27/26025 |
| 2022/0209931 | A1* | 6/2022 | Hewavithana | H04L 25/0212 |
| 2023/0036387 | A1* | 2/2023 | Soltani | H04W 56/0035 |
| 2024/0056924 | A1* | 2/2024 | Ramamurthy | H04W 56/0045 |
| 2024/0057052 | A1* | 2/2024 | Zhao | H04W 72/0453 |
| 2024/0057155 | A1* | 2/2024 | Liu | H04L 5/0053 |
| 2024/0063840 | A1* | 2/2024 | Jung | H04B 1/401 |
| 2024/0064359 | A1* | 2/2024 | Toma | H04N 21/26283 |
| 2024/0064713 | A1* | 2/2024 | Sun | H04W 72/0446 |
| 2024/0064750 | A1* | 2/2024 | Myung | H04L 5/0094 |

* cited by examiner

300

400

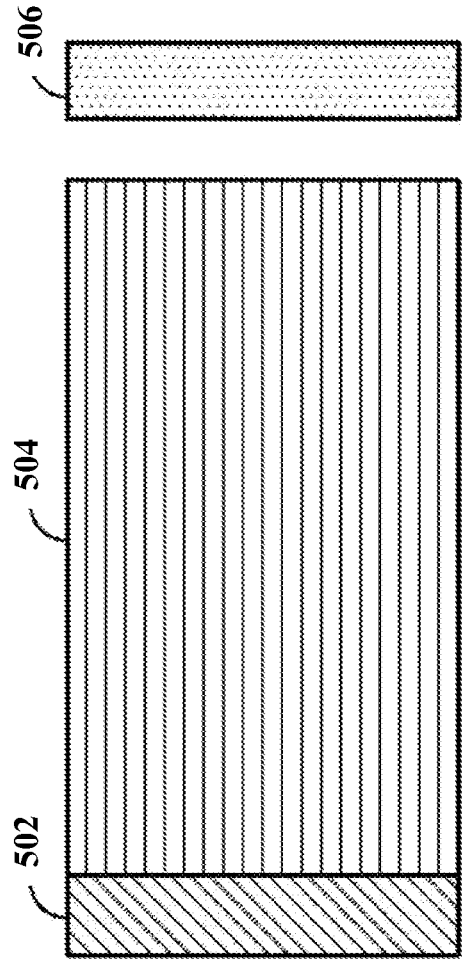
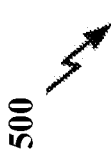
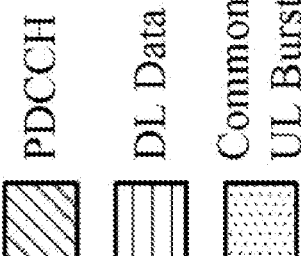
FIG. 5

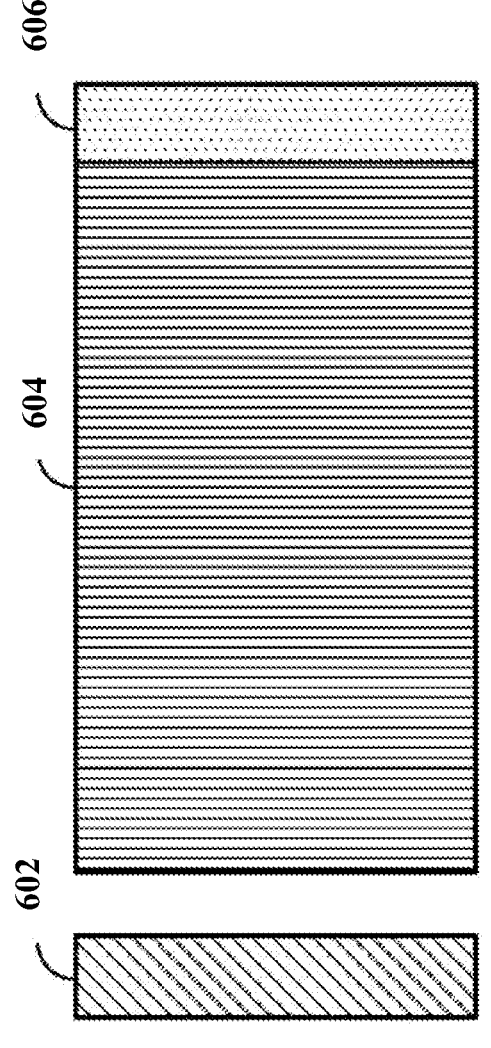
 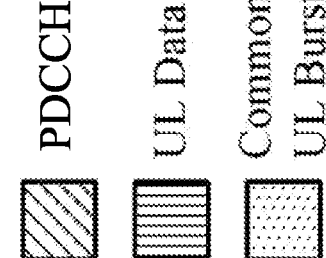
FIG. 6

700

SSB 712

SC 239

RB 780

RE 782-11

SC 239

SC 183

MIB DATA 717

PBCH DM-RS 719

RE 782-0    SC 228

SC 55

SC 0

OFDM Symbol 790   OFDM Symbol 791   OFDM Symbol 792   OFDM Symbol 793

PSS 714
SSS 716
PBCH 718
Not Used

SS Burst Set 722

SS Burst Set 724

SS Burst Set 726

T₁  5 ms

T₂

T₃

20 Ms =
Default SS Burst Set
Periodicity

SSB 724-1  -2  -3  -4    -5  -6  -7  -8

702

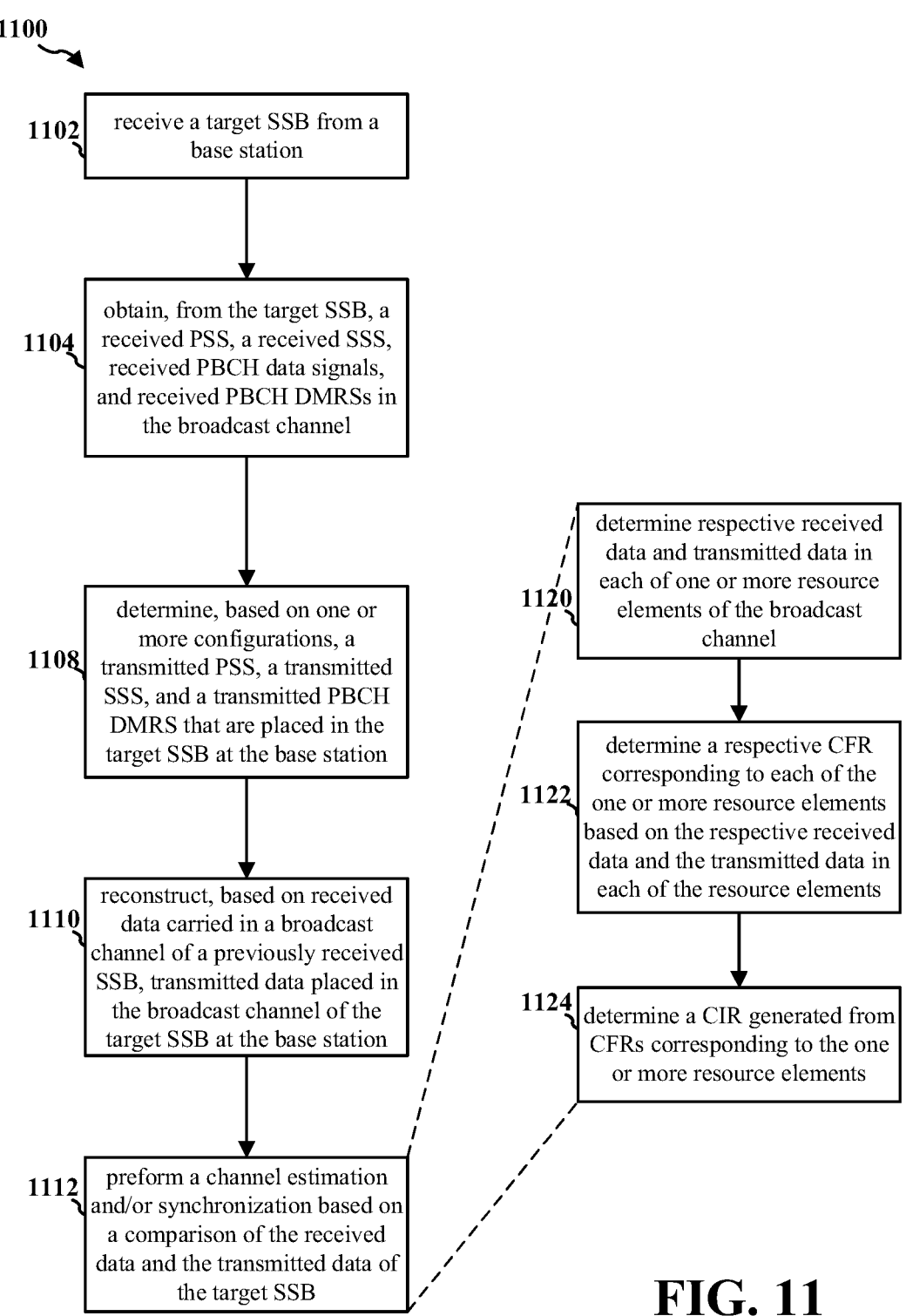

1100

1102  receive a target SSB from a base station 1104  obtain, from the target SSB, a received PSS, a received SSS, received PBCH data signals, and received PBCH DMRSs in the broadcast channel 1108  determine, based on one or more configurations, a transmitted PSS, a transmitted SSS, and a transmitted PBCH DMRS that are placed in the target SSB at the base station 1110  reconstruct, based on received data carried in a broadcast channel of a previously received SSB, transmitted data placed in the broadcast channel of the target SSB at the base station 1112  preform a channel estimation and/or synchronization based on a comparison of the received data and the transmitted data of the target SSB 1120  determine respective received data and transmitted data in each of one or more resource elements of the broadcast channel 1122  determine a respective CFR corresponding to each of the one or more resource elements based on the respective received data and the transmitted data in each of the resource elements 1124  determine a CIR generated from CFRs corresponding to the one or more resource elements

FIG. 11

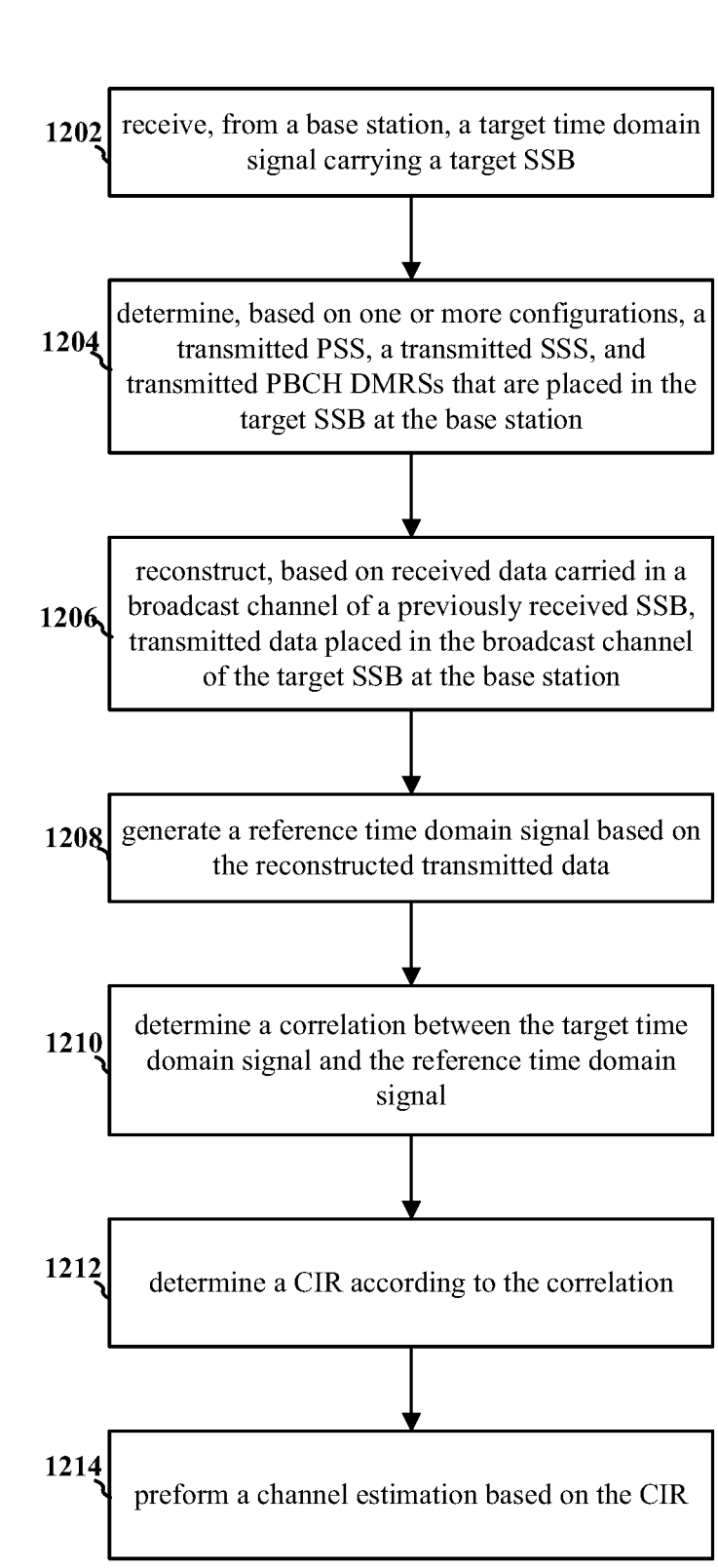

1200

1202  receive, from a base station, a target time domain signal carrying a target SSB 1204  determine, based on one or more configurations, a transmitted PSS, a transmitted SSS, and transmitted PBCH DMRSs that are placed in the target SSB at the base station 1206  reconstruct, based on received data carried in a broadcast channel of a previously received SSB, transmitted data placed in the broadcast channel of the target SSB at the base station 1208  generate a reference time domain signal based on the reconstructed transmitted data 1210  determine a correlation between the target time domain signal and the reference time domain signal 1212  determine a CIR according to the correlation 1214  preform a channel estimation based on the CIR

FIG. 12

DATA-AIDED SSB SIGNAL PROCESSING

CROSS-REFERENCE TO RELATED APPLICATION(S)

This application claims the benefits of U.S. Provisional Application Ser. No. 63/296,898, entitled "FREQUENCY DOMAIN SSB-BM-CENE WITH PBCH REBUILD" and filed on Jan. 6, 2022 and U.S. Provisional Application Ser. No. 63/297,247, entitled "TIME DOMAIN SSB-BM-CENE WITH PBCH REBUILD AND SUB-SYMBOL SWEEPING" and filed on Jan. 7, 2022, both of which are expressly incorporated by reference herein in their entirety.

BACKGROUND

Field

The present disclosure relates generally to communication systems, and more particularly, to techniques of synchronization signal block (SSB) signal processing with physical broadcast channel (PBCH) rebuild at user equipment (UE).

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE receives a target synchronization signal block (SSB) from a base station. The UE obtains received data carried in a broadcast channel of the target SSB. The UE reconstructs, based on received data carried in a broadcast channel of a previously received SSB, transmitted data placed in the broadcast channel of the target SSB at the base station. The UE preforms a channel estimation and/or synchronization based on a comparison of the received data and the transmitted data of the target SSB.

In another aspect of the disclosure, a method, a computer-readable medium, and an apparatus are provided. The apparatus may be a UE. The UE receives, from a base station, a target time domain signal carrying a target SSB. The target SSB includes received data carried in a broadcast channel of the target SSB. The UE reconstructs, based on received data carried in a broadcast channel of a previously received SSB, transmitted data placed in the broadcast channel of the target SSB at the base station. The UE generates a reference time domain signal based on the reconstructed transmitted data. The UE preforms a channel estimation based on a comparison of the target time domain signal and the reference time domain signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5 is a diagram showing an example of a DL-centric slot.

FIG. 6 is a diagram showing an example of an UL-centric slot.

FIG. 11 is a flow chart of a method (process) for data-aided SSB channel estimation and/or synchronization in frequency domain.

FIG. 12 is a flow chart of a method (process) for data-aided SSB channel estimation in time domain.

DETAILED DESCRIPTION

Figure 1:
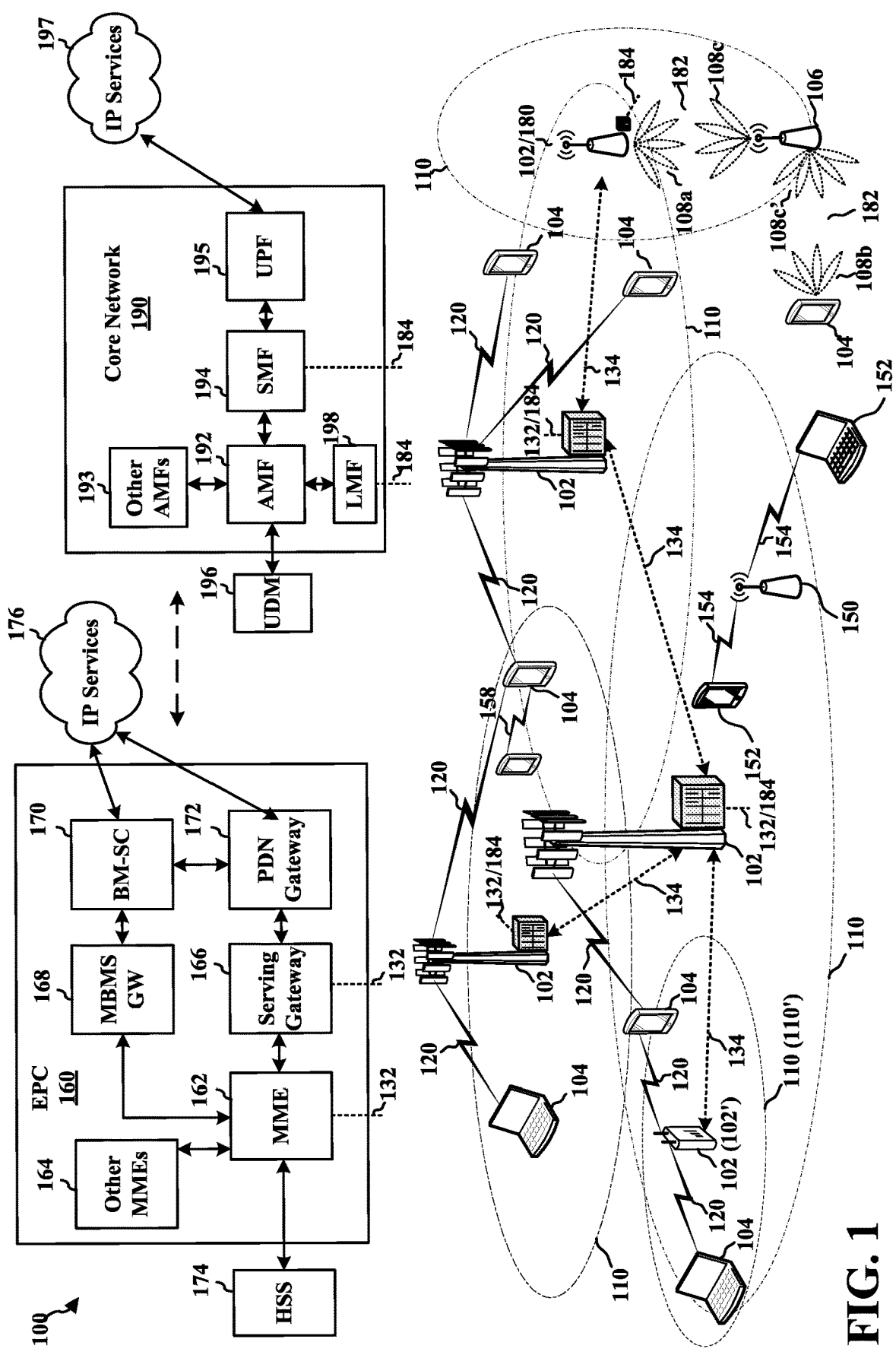
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., SI interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to 7 MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108a. The UE 104 may receive the beamformed signal from the base station 180 in one or more receive directions 108b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Figure 2:
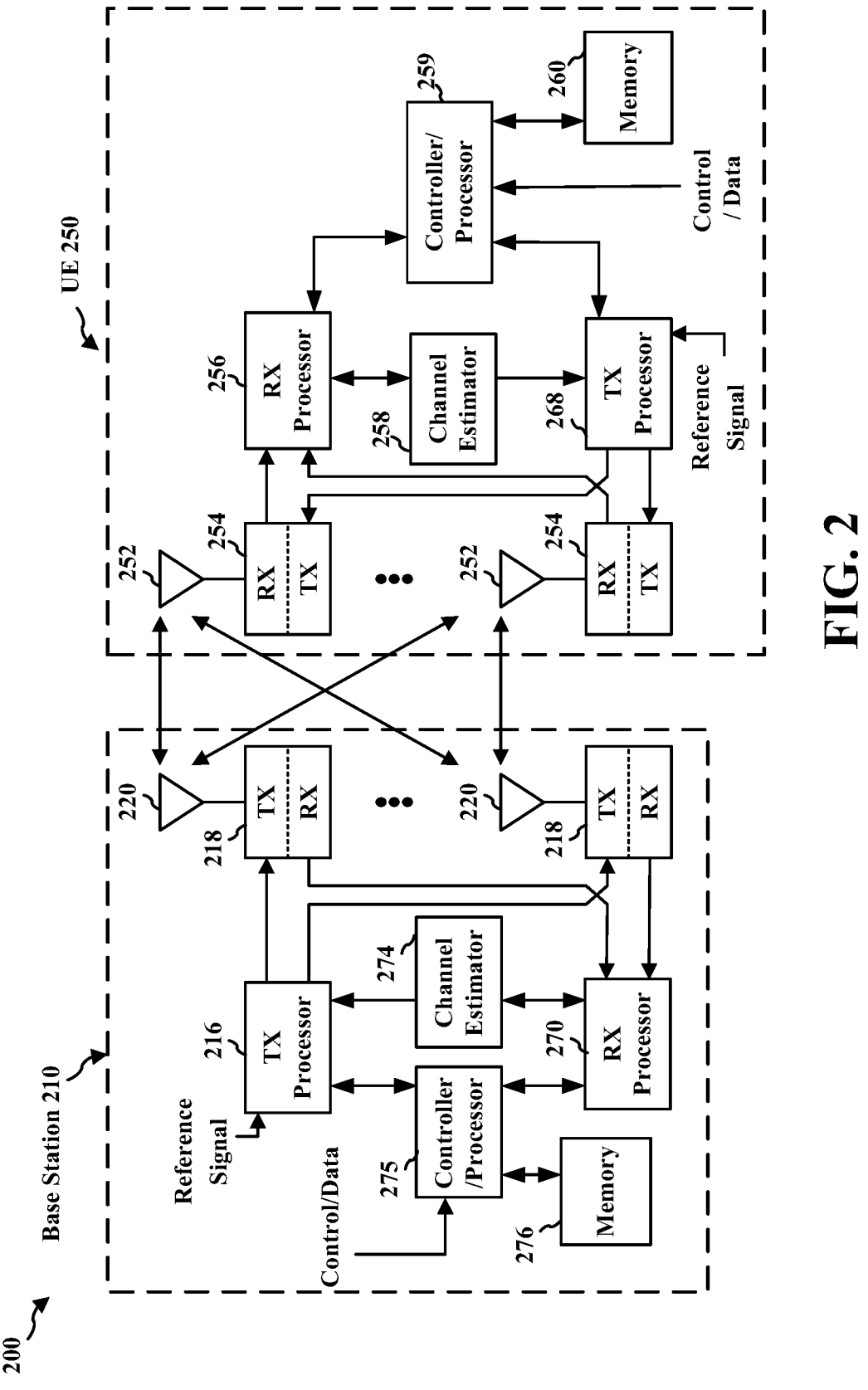
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHz may be supported. In one example, NR resource blocks (RBs) may span 12 sub-carriers with a sub-carrier bandwidth of 60 kHz over a 0.25 ms duration or a bandwidth of 30 kHz over a 0.5 ms duration (similarly, 50 MHz BW for 15 kHz SCS over a 1 ms duration). Each radio frame may consist of 10 subframes (10, 20, 40 or 80 NR slots) with a length of 10 ms. Each slot may indicate a link direction (i.e., DL or UL) for data transmission and the link direction for each slot may be dynamically switched. Each slot may include DL/UL data as well as DL/UL control data. UL and DL slots for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
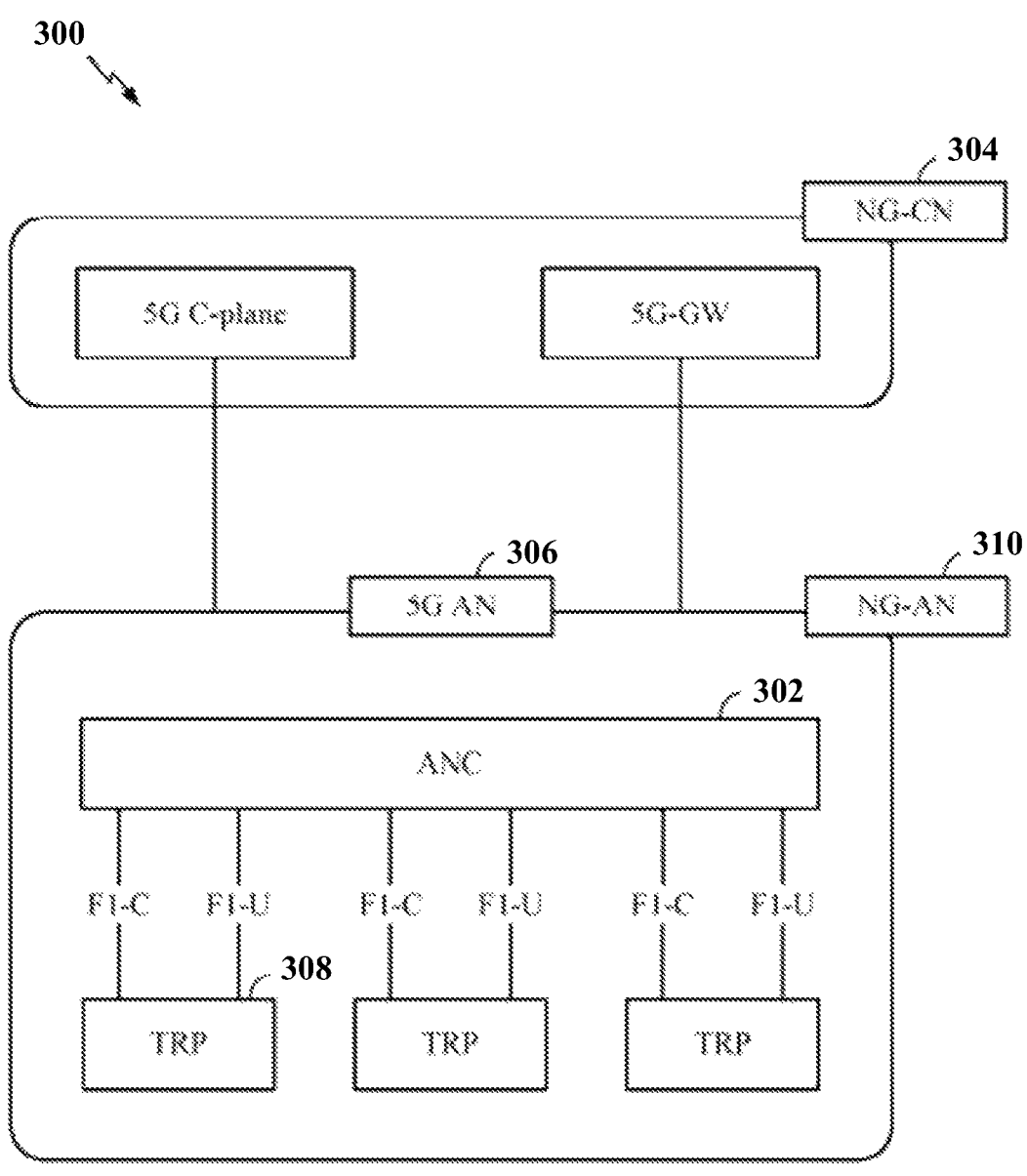
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
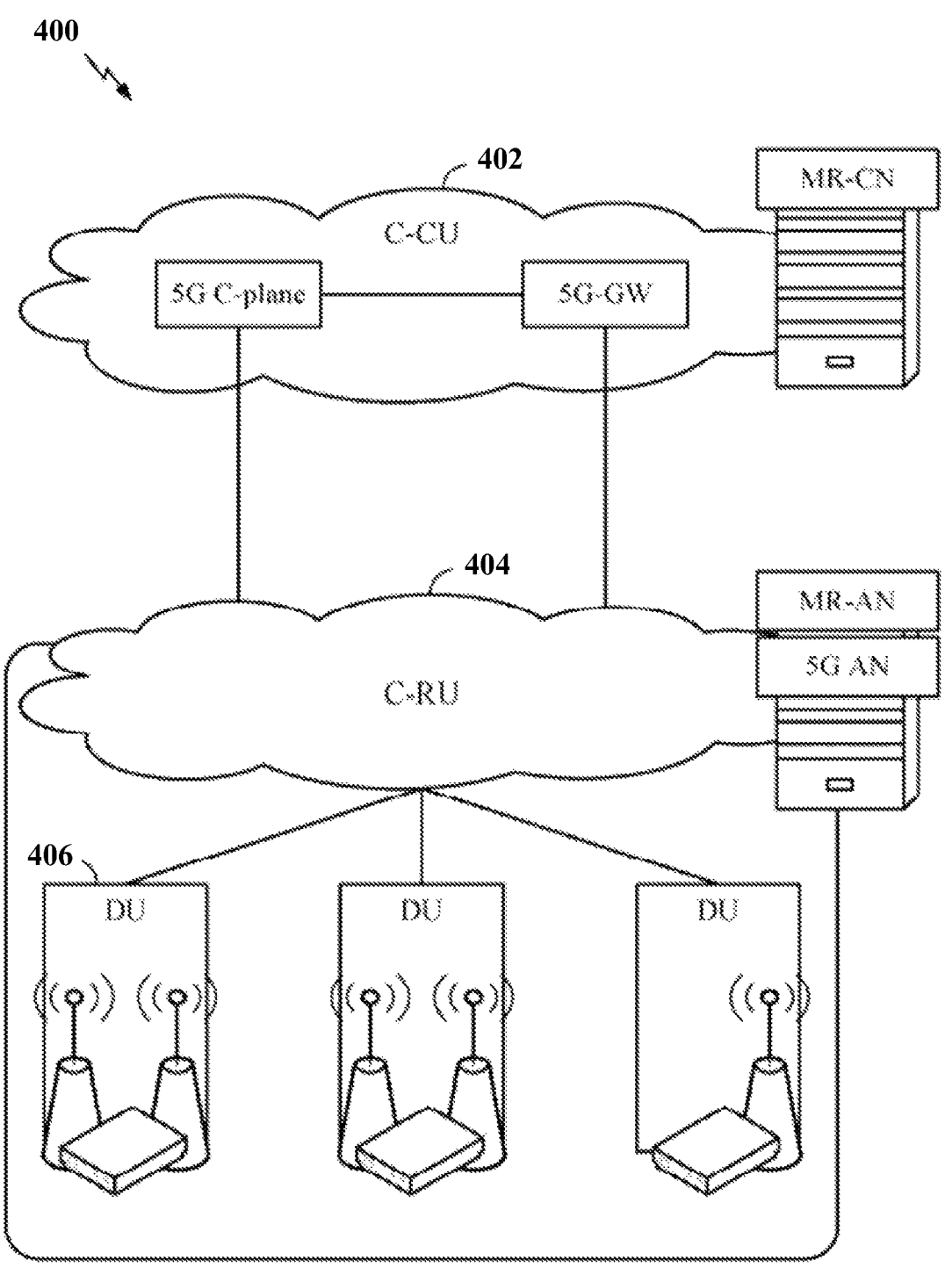
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

FIG. 5 is a diagram 500 showing an example of a DL-centric slot. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric slot and alternative structures having similar features may exist without necessarily deviating from the aspects described herein.

FIG. 6 is a diagram 600 showing an example of an UL-centric slot. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the pay load of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric slot may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 7:
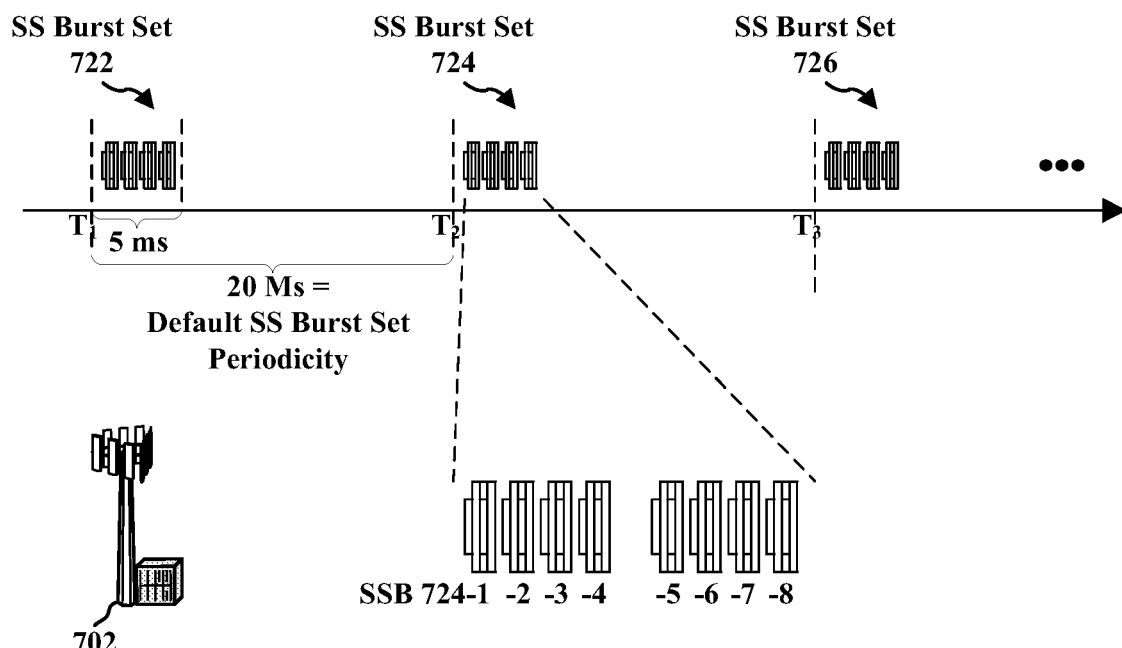
FIG. 7 is a diagram illustrating a time-frequency structure of a synchronization signal block (SSB) and an example of an SS burst set.

FIG. 7 is a diagram 700 illustrating a time-frequency structure of a synchronization signal block (SSB) and an example of an SS burst set. A base station 702 may transmit SS burst sets periodically. Each SS burst set includes a number of SSBs (e.g., 4, 8 or 64) that can be transmitted in different directions/beams during a short period of time (e.g., 5 ms). In this example, the base station 702 transmits an SS burst set 722, an SS burst set 724, and an SS burst set 726, which each includes eight SSBs (SSBs 722-1 to 722-8, SSBs 724-1 to 724-8 and SSBs 726-1 to 726-8, respectively).

An SSB consists of one OFDM symbol for the primary synchronization signal (PSS) and one OFDM symbol for the secondary synchronization signal (SSS). Furthermore, the SSB contains two OFDM symbols for the physical broadcast channel (PBCH). In this example, an SSB 712 spans an OFDM symbol 790, an OFDM symbol 791, an OFDM symbol 792 and an OFDM symbol 793 in time domain and spread over 240 subcarriers (e.g., SC 0 to SC 239) in frequency domain. The PSS 714 is transmitted in the first OFDM symbol 790, and occupies SCs 56 to 182, the remaining SCs 0 to 55 and SCs 183 to 239 in the OFDM symbol 790 are not used. The SSS 716 is transmitted in the third OFDM symbol 792, and occupies SCs 56-182. The 8 SCs 48-55 below SSS 716 and 9 SCs 183-191 over SSS 716 are not used. The PBCH 718 occupies SCs 0-239 of the second OFDM symbol 791 and the fourth OFDM symbol 793. In addition, the PBCH 718 also uses 48 SCs on each side of the SSS 716, i.e., SCs 0-47 and SCs 192-239, in OFDM symbol 792. Further, the PBCH 718 may include one or more PBCH DMRSs 719. In certain configurations, the PBCH DMRSs 719 occupies one of every four REs of the PBCH 718. The other REs in the PBCH 718 carries a master information block (MIB) 717.

The UE 704 detects SSBs transmitted from the base station 702 in order to perform channel estimation, beam management, and/or synchronization. In this example, the UE 704 detects the SS burst set 722 transmitted at a time point $t_1$. The UE 704 can measure the signal strength of each SSB of the SS burst set 722. From the measurement results, the UE 704 can identify an index of the SSB with the strongest signal strength. As described supra, different SSBs may be transmitted on different transmission beams. Based on the identified index, the UE 704 may determine an optimal transmission beam for the UE 704. In this example, the UE 704 determines that the SSB 722-1 has strongest signal strength. Accordingly, the UE 704 can determine the optimal transmission beam on which the SSB 722-1 is transmitted.

At time point $t_2$, the UE 704 detects the SS burst set 724. The UE 704 receives the PSS 714, SSS 716, PBCH DMRSs 719 of the SSB 724-1, which is on the same optimal transmission beam. The UE 704 measures the PSS 714, SSS 716, PBCH DMRSs 719 of the SSB 722-1 to perform channel estimation and/or synchronization. Further, the UE 704 can obtain the MIB data 717 carried in the PBCH 718 of the SSB 724-1 after the UE 704 decodes the PBCH 718 of the SSB 724-1.

At time point $t_3$, the UE 704 detects the SS burst set 726. The UE 704 receives the PSS 714, SSS 716, PBCH DMRSs 719 of the SSB 726-1, which is on the same optimal transmission beam. Further, the difference between the MIB data 717 in the SSB 724-1 and the MIB data 717 in the SSB 726-1 can be derived by the UE 704 bases on factors that are known to the UE 704. As such, the PSS 714, SSS 716, PBCH DMRSs 719 and the MIB data 717 transmitted in the SSB 726-1 are all known to the UE 704. Accordingly, the UE 704 can measure the PSS 714, SSS 716, PBCH DMRSs 719, and, additionally, the MIB data 717 of the SSB 726-1 to perform channel estimation and/or synchronization. In other words, the UE 704 can use the MIB data to assist channel estimation and/or synchronization.

Figure 8:
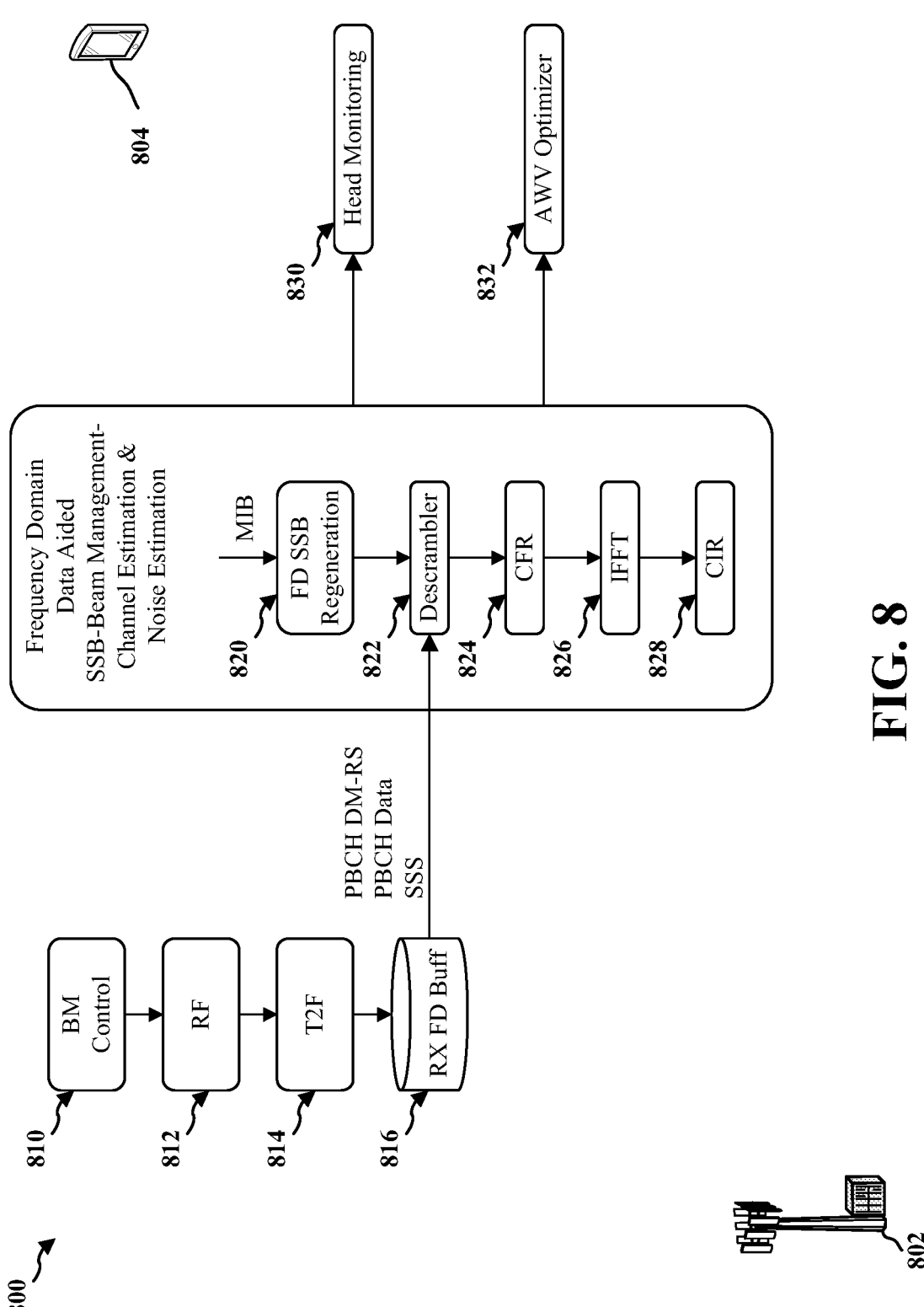
FIG. 8 is a diagram illustrating a data flow through components of a UE for frequency domain data aided SSB beam management, channel estimation, and noise estimation with PBCH rebuild.

FIG. 8 is a diagram illustrating a data flow through components of a UE for frequency domain data aided SSB beam management, channel estimation, and noise estimation with PBCH rebuild. As described supra, at the time point $t_1$, a BM control module 810 of the UE 804 can determine the optimal transmission beam transmitted by the base station 802 and adjust antennas of the UE 804 to monitor SSBs on the optimal transmission beam. In this example, the optimal transmission beam is the beam that carries the SSB 722-1.

Subsequently, at the time point $t_2$, a RF component 812 receives time domain RF signals transmitted in a time period including the OFDM symbols 790-793 of the SSB 724-1. A time to frequency (T2F) component 814 transforms the time domain RF signals to modulation symbols in REs in the OFDM symbols 790-793. The modulation symbols are stored in an RX FD buffer 816. Further, the modulation symbol in each RE is demodulated to obtain scrambled bits. As an example, a resource block (RB) 780, among other RBs, of the SSB 724-1 contains REs 782-0 to 782-11. The modulation symbols carried in the REs 782-0 to 782-11 are stored in the RX FD buffer 816. The UE 804 demodulates the modulation symbols to obtain scrambled bits, which are sent to a descrambler 822. The descrambler 822 descrambles the scrambled bits to obtain encoded bits of the SSB 724-1.

In this example, prior to that the UE 804 receives the SSB 724-1, the UE 804 has not decoded the MIB data 717 carried in SSBs. Therefore, the UE 804 does not use the MIB data 717 in prior SSBs (e.g., the SSB 722-1) to assist channel estimation. The UE 804 uses the PSS 714, the SSS 716, and the PBCH DMRS 719 to perform channel estimation.

The CFR component 824 can compare the received encoded bits in a selected (or each) RE that carries a PSS 714, a SSS 716, or a PBCH DMRS 719 with the encoded bits transmitted in that RE (which are known to the UE 804) at the base station 802, to determine a CFR of the subcarrier that carries the RE in an OFDM symbol that contains the RE. As an example, the RE 782-0 carries a PBCH DMRS 719, which is known to the UE 804. Accordingly, the UE 804 determines the encoded bits corresponding to the PBCH DMRS 719 transmitted by the base station 802 in the RE 782-0. Further, the UE 804 determines the encoded bits carried in the RE 782-0 based on the modulation symbol received in that RE by the UE 804. The UE 804 then compares the transmitted encoded bits with the received encoded bits in the RE 782-0 to determine a CFR for SC 228 in the OFDM symbol 793.

As such, the CFR component 824 determines CFRs for selected REs in each of the OFDM symbols 790, 791, 792, 793. The CFRs in each OFDM symbol is sent to an inverse fast Fourier transform (IFFT) component 826 to generate a time domain signal in that OFDM symbol. The time domain signal is subsequently sent to a CIR component 828, which generates a CIR for that OFDM symbol.

The CIR for the OFDM symbols 790, 791, 792, 793 generated at the CIR component 828 may be sent to a head monitoring component 830 and an AWV optimizer 832. The head monitoring component 830 may, based on the received CIR, select one or more antenna panels for receiving signals transmitted on the optimal transmission beam from the base station 802. Further, the AWV optimizer 832 can, based on the received CIR, optimize one or more antenna weight vectors that are to be applied to the antennas on the selected antenna panels to form an optimal reception beam.

At the time point t3, the UE 804 receives the SSB 726-1. The modulation symbols of SSB 726-1 are stored in the RX FD buffer 816. The UE 804 demodulates the modulation symbols to obtain scrambled bits, which are sent to a descrambler 822. The descrambler 822 descrambles the scrambled bits to obtain encoded bits of the SSB 726-1.

As described supra, the difference between the MIB data 717 in the SSB 724-1 and the MIB data 717 in the SSB 726-1 can be derived by the UE 804 bases on factors that are known to the UE 804. As such, the MIB data 717 transmitted in the SSB 726-1 is known to the UE 804. An FD SSB regeneration component 820 encodes, by using the same encoder used by the base station 802, the derived MIB data 717 to generate derived encoded bits. The FD SSB regeneration component 820 further maps the derived encoded bits to REs of the PBCH 718 of the SSB 726-1. Therefore, for each RE (e.g., the RE 782-11) of the PBCH 718 that carries the MIB data 717, the UE 804 knows the received encoded bits as well as the derived encoded bits for that RE.

The UE 804 can use the MIB data 717 in the SSB 726-1 to assist channel estimation. More specifically, the UE 804 uses the PSS 714, the SSS 716, the PBCH DMRS 719 and the MIB data 717 in the SSB 726-1 to perform channel estimation. The CFR component 824 can compare the received encoded bits in each or a selected RE that carries a PSS 714, a SSS 716, a PBCH DMRS 719, or MIB data 717 with the encoded bits transmitted in that RE at the base station 802, to determine a CFR of the subcarrier that carries the RE in an OFDM symbol that contains the RE.

As such, the CFR component 824 determines CFRs for all or the selected REs in each of the OFDM symbols 790, 791, 792, 793. The CFRs in one OFDM symbol is send to the IFFT component 826 to generate a time domain signal in that OFDM symbol. The time domain signal is subsequently sent to a CIR component 828, which generates a CIR for that OFDM symbol. The CIR for the OFDM symbols 790, 791, 792, 793 generated at the CIR component 828 may be used by the head monitoring component 830 and the AWV optimizer 832, as described supra.

Figure 9:
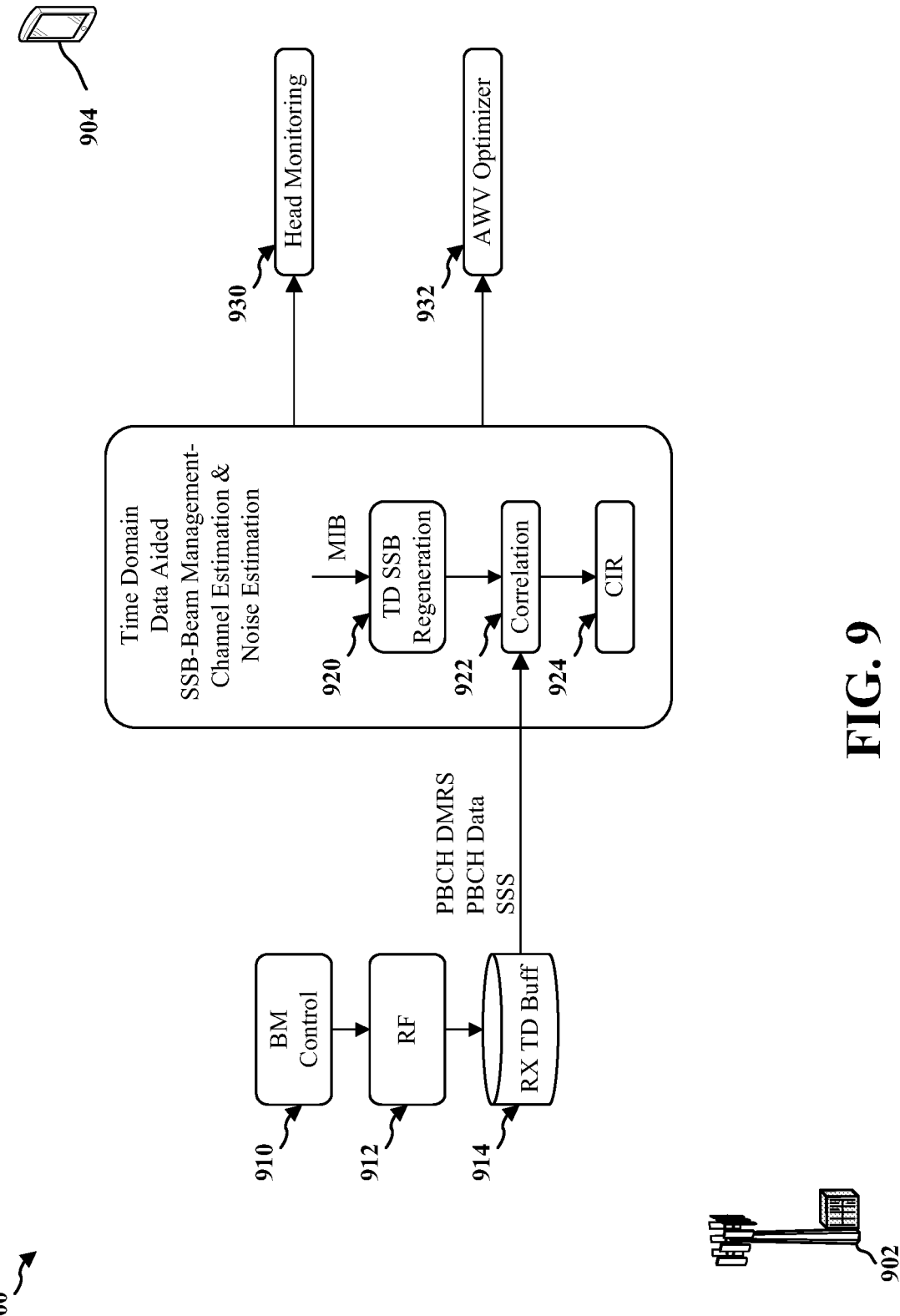
FIG. 9 is a diagram illustrating a data flow through components of a UE for time domain data aided SSB beam management, channel estimation, and noise estimation with PBCH rebuild.

FIG. 9 is a diagram illustrating a data flow through components of a UE for time domain data aided SSB beam management channel estimation and noise estimation with PBCH rebuild. As described supra, a BM control module 910 of a UE 904 determines, based on the SSB 722-1 (and maybe prior SSBs), the optimal transmission beam transmitted by the base station 902 and adjust antennas of the UE 904 to monitor SSBs on the optimal transmission beam. In this example, the optimal transmission beam is the beam that carries the SSB 722-1.

Subsequently, at the time point $t_2$, the UE 904 receives the SSB 724-1. Similar to what was described supra referring to FIG. 8, the UE 904 can perform channel estimation based on the received signals.

In this example, prior to that the UE 904 receives the SSB 724-1, the UE 904 has not decoded the MIB data 717 carried in SSBs. Therefore, the UE 904 does not use the MIB data 717 in prior SSBs (e.g., the SSB 722-1) to assist channel estimation. The UE 904 uses the PSS 714, the SSS 716, and the PBCH DMRS 719 to perform channel estimation.

At the time point $t_3$, the UE 904 receives the SSB 726-1. More specifically, an RF component 912 receives time domain RF signals transmitted in a time period including the OFDM symbols 790-793. The RF component filters out the RF carriers and obtain a baseband time domain signal for the time period including the OFDM symbols 790, 791, 792, 793, which is stored in an RX TD buffer 914.

As described supra, the difference between the MIB data 717 in the SSB 724-1 and the MIB data 717 in the SSB 726-1 can be derived by the UE 904 bases on factors that are known to the UE 904. As such, the MIB data 717 transmitted in the SSB 726-1 is known to the UE 904. A TD SSB regeneration component 920 encodes, by using the same encoder used by the base station 902, the derived MIB data 717 to generate derived encoded bits. The TD SSB regeneration component 920 further maps the derived encoded bits to REs of the PBCH 718 of the SSB 726-1. The TD SSB regeneration component 920 further uses the same modulation scheme (e.g., QPSK) as the base station 902 to modulate the encoded bits in each RE that carry the MIB data 717 into a modulation symbol. The PSS 714, the SSS 716, the PBCH DMRS 719 transmitted at the base station 902 are also known to the TD SSB regeneration component 920. Therefore, the TD SSB regeneration component 920 can generate a modulation symbol as transmitted at the base station 902 for each RE of the SSB 726-1. In other words, the corresponding modulation symbol in each RE of the SSB 726-1 is known.

Subsequently, the TD SSB regeneration component 920 apply IFFT to modulation symbols in each of the OFDM symbols 790, 791, 792, 793 to generate a respective time domain signal for that OFDM symbol. The TD SSB regeneration component 920 can combine all time domain signals to generate a derived time domain signal for the SSB time period including the OFDM symbols 790, 791, 792, 793.

As described supra, a received baseband time domain signal for the SSB time period has been stored in the RX TD buffer 914. A correlation component 922 can obtain the received time domain signal from the RX TD buffer 914 and the derived time domain signal from the TD SSB regeneration component 920. The correlation component 922 further correlates the received time domain signal with the derived time domain signal. The correlation result is sent to a CIR component 924, which generates a CIR for the SSB time period including the OFDM symbols 790, 791, 792, 793. The CIR may be sent to a head monitoring component 930 and an AWV optimizer 932.

Figure 10:
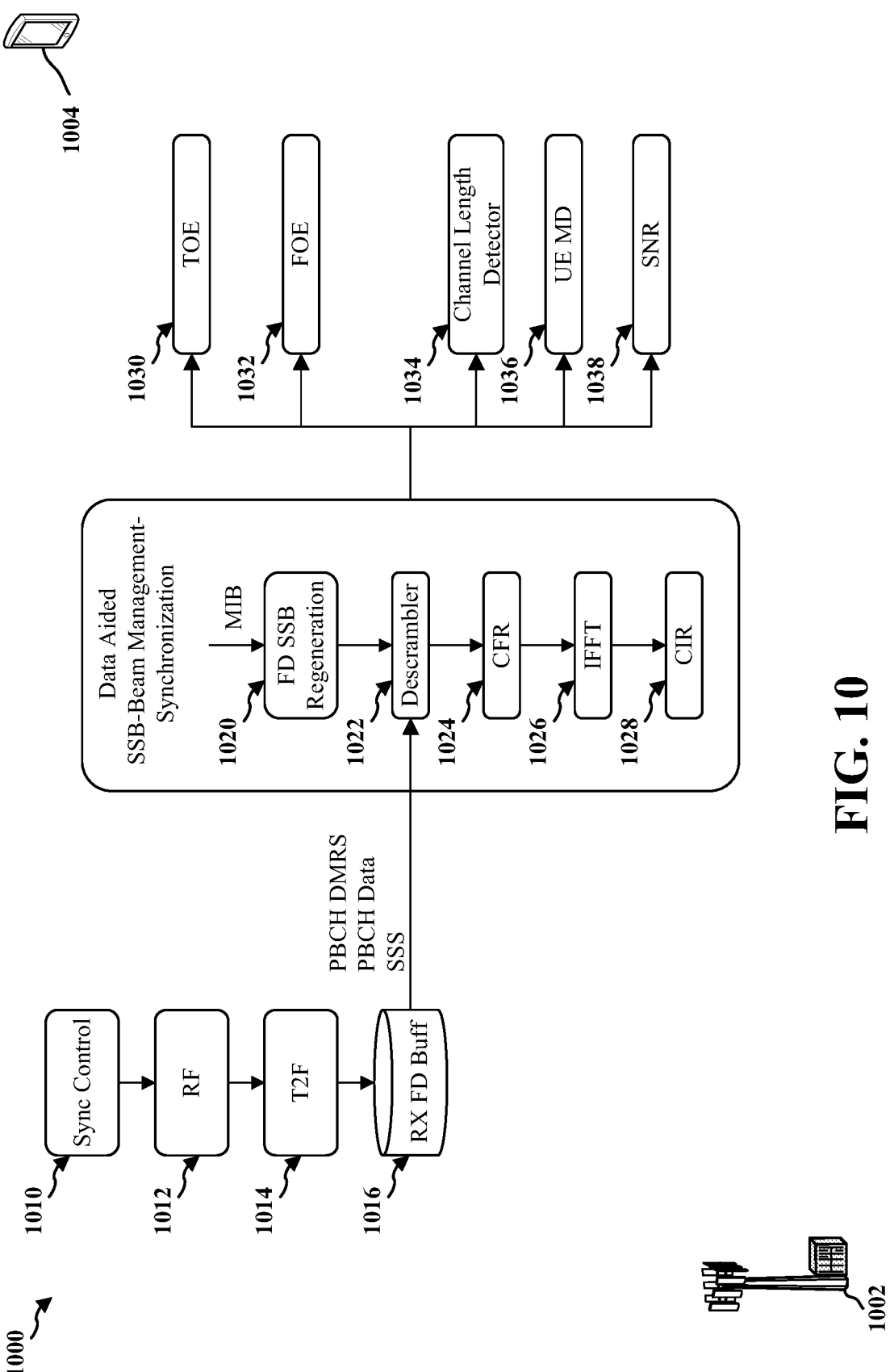
FIG. 10 is a diagram illustrating a data flow through components of a UE for data aided SSB synchronization with PBCH rebuild.

FIG. 10 is a diagram illustrating a data flow through components of a UE for data aided SSB synchronization with PBCH rebuild. This process is similar to the process described supra referring to FIG. 8. A synchronization control module 1010 controls a RF component 1012 to receive the SSB 722-1, the SSB 724-1, and the SSB 726-1, etc. In this example, the optimal transmission beam is the beam that carries the SSB 722-1. A T2F component 1014 transforms the time domain signals to frequency domain signals. Modulation symbols of an SSB obtained from the frequency domain signals are stored in a RX FD buffer 1016.

Further, the modulation symbols in the SSB are demodulated to obtain scrambled bits, which are sent to a descrambler 1022. The descrambler 1022 descrambles the scrambled bits to obtain encoded bits of the SSB.

As described supra referring to FIG. 8, the UE 1004 decodes the PBCH 718 of the SSB 724-1 and obtains MIB data 717 carried in the SSB 724-1. After the UE 1004 receives the SSB 726-1, the UE 1004 can derive the MIB data 717 carried in the SSB 726-1 based on the MIB data 717 carried in the SSB 724-1. An FD SSB regeneration component 1020 generates derived encoded bits for REs of the SSB 726-1. Therefore, for each RE (e.g., the RE 782-11) of the PBCH 718 that carries the MIB data 717, the UE 1004 knows the received encoded bits as well as the derived encoded bits for that RE.

The descrambled bits (both received and transmitted) of the PSS 714, the SSS 716, the PBCH 718 (including from both REs carrying the PBCH DMRS 719 or the MIB data 717) are sent to a CFR component 1024, which can accordingly determine CFRs for REs of the SSB 726-1. Further, the CFRs of REs carrying the PSS 714, the SSS 716, the PBCH DMRS 719, and the MIB data 717 in each of the OFDM symbols 790, 791, 792, 793 are sent to an IFFT component 1026, which can accordingly generate CIRs for the OFDM symbols 790, 791, 792, 793. Similarly, the CFRs and/or the CIRs are sent to a time offset estimation (TOE) 1030 to detect time offset. The CFRs and/or the CIRs are sent to a frequency offset estimation (FOE) 1032 to detect frequency offset. The CFRs and/or the CIRs are sent to a channel length detector 1034 to detect a channel length. The CFRs and/or the CIRs are sent to a user equipment mobility detection (UE MD) component 1036 to detect UE mobility. The CFRs and/or the CIRs are sent to a signal-to-noise ratio (SNR) component 1038 to determine SNR.

FIG. 11 is a flow chart 1100 of a method (process) for data-aided SSB channel estimation and/or synchronization in frequency domain. The method may be performed by a UE (e.g., the UE 704, the UE 804, or the UE 1004). At operation 1102, the UE receives a target SSB from a base station. At operation 1104, the UE obtains, from the target SSB, a received PSS, a received SSS, received PBCH data signals and received PBCH DMRSs in the broadcast channel.

At operation 1108, the UE determines, based on one or more configurations, a transmitted PSS, a transmitted SSS, and a transmitted PBCH DMRS that are placed in the target SSB at the base station. At operation 1110, the UE reconstructs, based on received data carried in a broadcast channel of a previously received SSB, transmitted data placed in the broadcast channel of the target SSB at the base station.

At operation 1112, the UE preforms a channel estimation and/or synchronization based on a comparison of the received data and the transmitted data of the target SSB. The channel estimation or synchronization is performed further based on a comparison of the received PSS and the transmitted PSS, a comparison of the received SSS and the transmitted SSS, and a comparison of the received PBCH DMRS and the transmitted PBCH DMRS.

In certain configurations, to compare the received data and the transmitted data of the target SSB, at operation 1120, the UE determines respective received data and transmitted data in each of one or more resource elements of the broadcast channel. At operation 1122, the UE determines a respective CFR corresponding to each of the one or more resource elements based on the respective received data and the transmitted data in each of the resource elements. At operation 1124, the UE determines a CIR generated from CFRs corresponding to the one or more resource elements.

FIG. 12 is a flow chart 1200 of a method (process) for data-aided SSB channel estimation in time domain. The method may be performed by a UE (e.g., the UE 704, or the UE 904). At operation 1202, the UE receives, from a base station, a target time domain signal carrying a target SSB. The target SSB includes received data carried in a broadcast channel of the target SSB. The target SSB further includes a received PSS, a received SSS, and received PBCH DMRSs in the broadcast channel.

At operation 1204, the UE determines, based on one or more configurations, a transmitted PSS, a transmitted SSS, and transmitted PBCH DMRSs that are placed in the target SSB at the base station. At operation 1206, the UE reconstructs, based on received data carried in a broadcast channel of a previously received SSB, transmitted data placed in the broadcast channel of the target SSB at the base station.

At operation 1208, the UE generates a reference time domain signal based on the reconstructed transmitted data. In particular, the reference time domain signal is generated further based on the transmitted PSS, the transmitted SSS, and the transmitted PBCH DMRSs.

At operation 1210, the UE determines a correlation between the target time domain signal and the reference time domain signal. At operation 1212, the UE determines a CIR according to the correlation. At operation 1214, the UE preforms a channel estimation based on the CIR.

Figure 13:
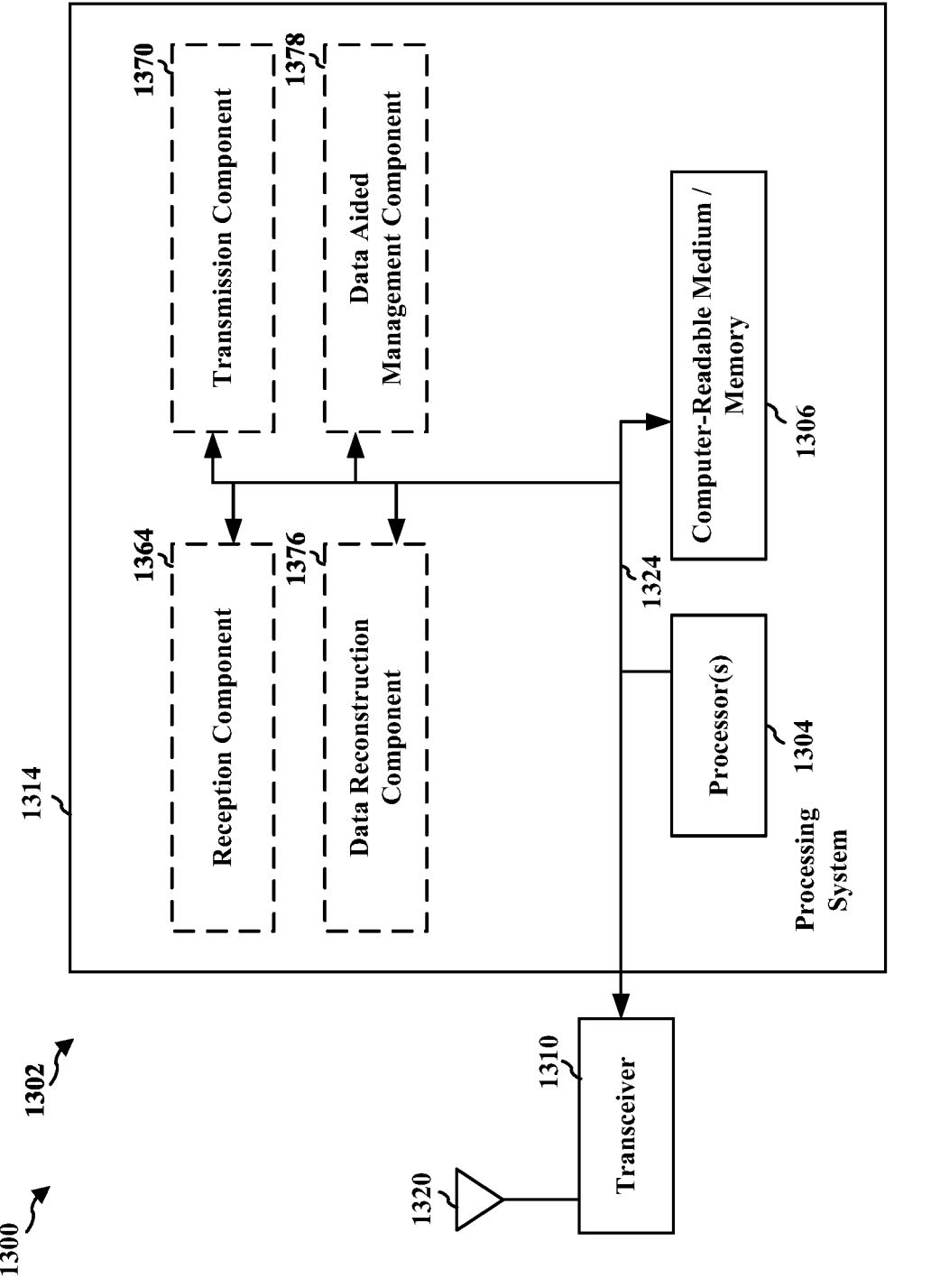
FIG. 13 is a diagram illustrating an example of a hardware implementation for an apparatus employing a processing system.

FIG. 13 is a diagram 1300 illustrating an example of a hardware implementation for an apparatus 1302 employing a processing system 1314. The apparatus 1302 may be a UE (e.g., the UE 704, the UE 804, the UE 904, or the UE 1004). The processing system 1314 may be implemented with a bus architecture, represented generally by a bus 1324. The bus 1324 may include any number of interconnecting buses and bridges depending on the specific application of the processing system 1314 and the overall design constraints. The bus 1324 links together various circuits including one or more processors and/or hardware components, represented by one or more processors 1304, a reception component 1364, a transmission component 1370, a data reconstruction component 1376, a data aided management component 1378, and a computer-readable medium/memory 1306. The bus 1324 may also link various other circuits such as timing sources, peripherals, voltage regulators, and power management circuits, etc.

The processing system 1314 may be coupled to a transceiver 1310, which may be one or more of the transceivers 254. The transceiver 1310 is coupled to one or more antennas 1320, which may be the communication antennas 252.

The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1364. In addition, the transceiver 1310 receives information from the processing system 1314, specifically the transmission component 1370, and based on the received information, generates a signal to be applied to the one or more antennas 1320.

The processing system 1314 includes one or more processors 1304 coupled to a computer-readable medium/memory 1306. The one or more processors 1304 are responsible for general processing, including the execution of software stored on the computer-readable medium/memory 1306. The software, when executed by the one or more processors 1304, causes the processing system 1314 to perform the various functions described supra for any particular apparatus. The computer-readable medium/memory 1306 may also be used for storing data that is manipulated by the one or more processors 1304 when executing software. The processing system 1314 further includes at least one of the reception component 1364, the transmission component 1370, the data reconstruction component 1376, and the data aided management component 1378. The components may be software components running in the one or more processors 1304, resident/stored in the computer readable medium /memory 1306, one or more hardware components coupled to the one or more processors 1304, or some combination thereof The processing system 1314 may be a component of the UE 250 and may include the memory 260 and/or at least one of the TX processor 268, the RX processor 256, and the communication processor 259.

In one configuration, the apparatus 1302 for wireless communication includes means for performing each of the operations of FIGS. 11-12. The aforementioned means may be one or more of the aforementioned components of the apparatus 1302 and/or the processing system 1314 of the apparatus 1302 configured to perform the functions recited by the aforementioned means.

As described supra, the processing system 1314 may include the TX Processor 268, the RX Processor 256, and the communication processor 259. As such, in one configuration, the aforementioned means may be the TX Processor 268, the RX Processor 256, and the communication processor 259 configured to perform the functions recited by the aforementioned means.

It is understood that the specific order or hierarchy of blocks in the processes/ flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

19

20

What is claimed is:

1. A method of wireless communication of a user equipment (UE), comprising:

receiving a target synchronization signal block (SSB) from a base station;

obtaining received data carried in a broadcast channel of the target SSB;

reconstructing, based on received data carried in a broadcast channel of a previously received SSB, transmitted data placed in the broadcast channel of the target SSB at the base station; and performing a channel estimation and/or synchronization based on a comparison of the received data and the transmitted data of the target SSB.

2. The method of claim 1, further comprising:

obtaining, from the target SSB, a received primary synchronization signal (PSS), a received secondary synchronization signal (SSS), and received PBCH demodulation reference signals (DMRSs) in the broadcast channel; and determining, based on one or more configurations, a transmitted PSS, a transmitted SSS, and a transmitted PBCH DMRS that are placed in the target SSB at the base station, wherein the channel estimation and/or synchronization is performed further based on a comparison of the received PSS and the transmitted PSS, a comparison of the received SSS and the transmitted SSS, a comparison of the received data and the transmitted data, and a comparison of the received PBCH DMRS and the transmitted PBCH DMRS.

3. The method of claim 1, wherein the comparison of the received data and the transmitted data of the target SSB includes:

determining respective received data and transmitted data in each of one or more resource elements of the broadcast channel;

determining a respective channel frequency response (CFR) corresponding to each of the one or more resource elements based on the respective received data and the transmitted data in each of the resource elements; and determining a channel impulse response (CIR) generated from CFRs corresponding to the one or more resource elements.

4. The method of claim 1, wherein the reconstructing comprises:

deriving master information block (MIB) data to be transmitted in the target SSB based on MIB data decoded from the previously received SSB; and encoding the derived MIB data using a same encoder as used by the base station to generate encoded bits corresponding to the transmitted data.

5. The method of claim 4, wherein the comparison includes comparing the received data in resource elements of the broadcast channel with the encoded bits generated from the derived MIB data to determine channel frequency responses for the resource elements carrying the MIB data, wherein the channel estimation and/or synchronization is performed using the determined channel frequency responses.

6. A method of wireless communication of a user equipment (UE), comprising:

receiving, from a base station, a target time domain signal carrying a target synchronization signal block (SSB), the target SSB including received data carried in a broadcast channel of the target SSB;

reconstructing, based on received data carried in a broadcast channel of a previously received SSB, transmitted data placed in the broadcast channel of the target SSB at the base station;

generating a reference time domain signal based on the reconstructed transmitted data; and performing a channel estimation based on a comparison of the target time domain signal and the reference time domain signal.

7. The method of claim 6, wherein the comparison of the target time domain signal and the reference time domain signal determines a correlation between the target time domain signal and the reference time domain signal.

8. The method of claim 7, further comprising:

determining a channel impulse response (CIR) according to the correlation.

9. The method of claim 6, wherein the target SSB further includes a received primary synchronization signal (PSS), a received secondary synchronization signal (SSS), and received PBCH demodulation reference signals (DMRSs) in the broadcast channel;

the method further comprising:

determining, based on one or more configurations, a transmitted PSS, a transmitted SSS, and transmitted PBCH DMRSs that are placed in the target SSB at the base station, wherein the reference time domain signal is generated further based on the transmitted PSS, the transmitted SSS, and the transmitted PBCH DMRSs.

10. An apparatus for wireless communication, the apparatus being a user equipment (UE), comprising:

a memory; and at least one processor coupled to the memory and configured to:

receive a target synchronization signal block (SSB) from a base station;

obtain received data carried in a broadcast channel of the target SSB;

reconstruct, based on received data carried in a broadcast channel of a previously received SSB, transmitted data placed in the broadcast channel of the target SSB at the base station; and perform a channel estimation and/or synchronization based on a comparison of the received data and the transmitted data of the target SSB.

11. The apparatus of claim 10, wherein the at least one processor is further configured to:

obtain, from the target SSB, a received primary synchronization signal (PSS), a received secondary synchronization signal (SSS), and received PBCH demodulation reference signals (DMRSs) in the broadcast channel; and determine, based on one or more configurations, a transmitted PSS, a transmitted SSS, and a transmitted PBCH DMRS that are placed in the target SSB at the base station, wherein the channel estimation and/or synchronization is performed further based on a comparison of the received PSS and the transmitted PSS, a comparison of the received SSS and the transmitted SSS, a comparison of the received data and the transmitted data, and a comparison of the received PBCH DMRS and the transmitted PBCH DMRS.

12. The apparatus of claim 10, wherein to compare of the received data and the transmitted data of the target SSB, the at least one processor is further configured to:

determine respective received data and transmitted data in each of one or more resource elements of the broadcast channel;

determine a respective channel frequency response (CFR) corresponding to each of the one or more resource elements based on the respective received data and the transmitted data in each of the resource elements; and determine a channel impulse response (CIR) generated from CFRs corresponding to the one or more resource elements.

\* \* \* \* \*